United States Patent [19]

Arino et al.

[11] Patent Number: 4,882,980
[45] Date of Patent: Nov. 28, 1989

[54] TANDEM BRAKE BOOSTER

[75] Inventors: Masao Arino; Jinki Takase, both of Saitama, Japan

[73] Assignee: Jidosha Kiki Co., Ltd., Tokyo, Japan

[21] Appl. No.: 243,057

[22] Filed: Sep. 9, 1988

[30] Foreign Application Priority Data

Oct. 28, 1987 [JP] Japan .................... 62-164861[U]

[51] Int. Cl.⁴ .................. F01B 19/02; F15B 9/10
[52] U.S. Cl. ........................... 92/48; 92/128; 91/369.2; 403/320; 411/271
[58] Field of Search ............... 92/48, 49, 128; 403/320, 348, 349; 411/271, 925; 91/376 R, 369.2

[56] References Cited

U.S. PATENT DOCUMENTS

| | | | |
|---|---|---|---|
| 505,947 | 10/1893 | Löhnert | 411/925 X |
| 601,915 | 4/1898 | Thurmend | 411/925 X |
| 4,494,445 | 1/1985 | Furuta et al. | 92/49 X |
| 4,495,854 | 1/1985 | Hibino | 92/99 X |
| 4,512,237 | 4/1985 | Endoh et al. | 91/369 A |
| 4,619,185 | 10/1986 | Mori et al. | 91/369 R |
| 4,658,704 | 4/1987 | Mori et al. | 91/369 R |
| 4,718,328 | 1/1988 | Mori et al. | 91/376 R |
| 4,729,287 | 3/1988 | Boehm et al. | 92/99 X |

FOREIGN PATENT DOCUMENTS 15645 5/1914 United Kingdom ............ 411/271

Primary Examiner—Robert E. Garrett
Assistant Examiner—Mark A. Williamson
Attorney, Agent, or Firm—Flynn, Thiel, Boutell & Tanis

[57] ABSTRACT

An interconnecting structure between a hub and a nut of a tandem brake booster is disclosed. The nut is formed with a plurality of recesses while the hub is formed with anti-rotation locks extending radially outward for engagement with the recesses to prevent a rotation of the nut relative to the hub, and also formed with stops extending radially inward for abutment against an end of a push rod which is received within the hub to prevent such end from being withdrawn from the hub.

6 Claims, No Drawings

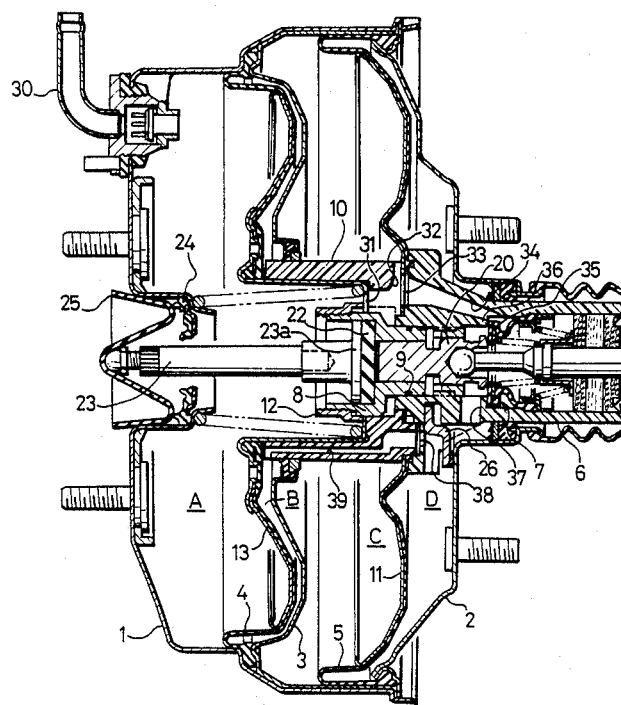

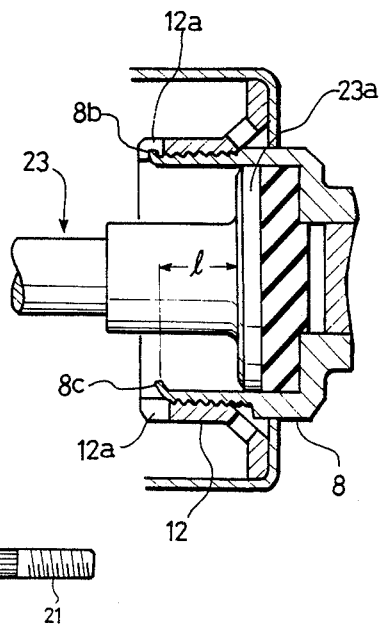

TANDEM BRAKE BOOSTER

FIELD OF THE INVENTION

The invention relates to a tandem brake booster, and more particularly, to an interconnecting structure between a hub and a nut.

DESCRIPTION OF THE PRIOR ART

A tandem brake booster is known in the art which comprises a hub fitted over an axial portion of a valve body so as to be prevented from being withdrawn forwardly from the valve body, a nut threadably engaged with the outer periphery of the hub at its front end for securing the hub to the valve body, and a push rod which is slidably fitted into the front end of the hub (see U.S. Pat. No. 4,658,704).

The nut may be locked against loosening by using incomplete threads on the nut and the hub or by utilizing a locking ring which is mounted on the hub in a non-rotatable manner while the nut is formed with a recess into which part of the locking ring is engaged by deforming it.

However, where incomplete threads are utilized, there is a need to achieve a threadable engagement between the nut and the hub by applying a clamping force of an increased magnitude, but because the hub is fitted into the axial portion of the valve body, it is difficult to hold it. On the other hand, where the locking ring is provided on the hub, a number of parts used increases, causing an increase in the cost.

As a general practice, suitable means which prevents withdrawal is provided to prevent the withdrawal of one end of the push rod from the hub, but again the provision of such means increases the number of parts used, also resulting in an increased cost.

SUMMARY OF THE INVENTION

In view of the foregoing, in a tandem brake booster of the kind described, in accordance with the invention, recesses are formed at a plurality of given positions in the nut while the hub is formed with stops which bulge radially inward into abutment against the end of the push rod to prevent its withdrawal, and also formed with anti-rotation locks which bulge radially outward into engagement with the recesses to provide an integral connection between the hub and the nut, both the stops and the locks being at locations which are disposed opposite to the recesses.

With this arrangement, merely forming recesses at given positions in the nut and forming stops and anti-rotation locks at given positions on the hub which extend radially inward and outward, respectively, is sufficient to prevent a withdrawal of the end of the push rod from the hub and any loosening of the nut with respect to the hub. In this manner, an increase in the number of parts used is avoided, thus allowing the arrangement to be inexpensively manufactured.

Above and other objects, features and advantages of the invention will become apparent from the following description of an embodiment thereof with reference to the attached drawings.

DETAILED DESCRIPTION OF EMBODIMENT

Figure 1:
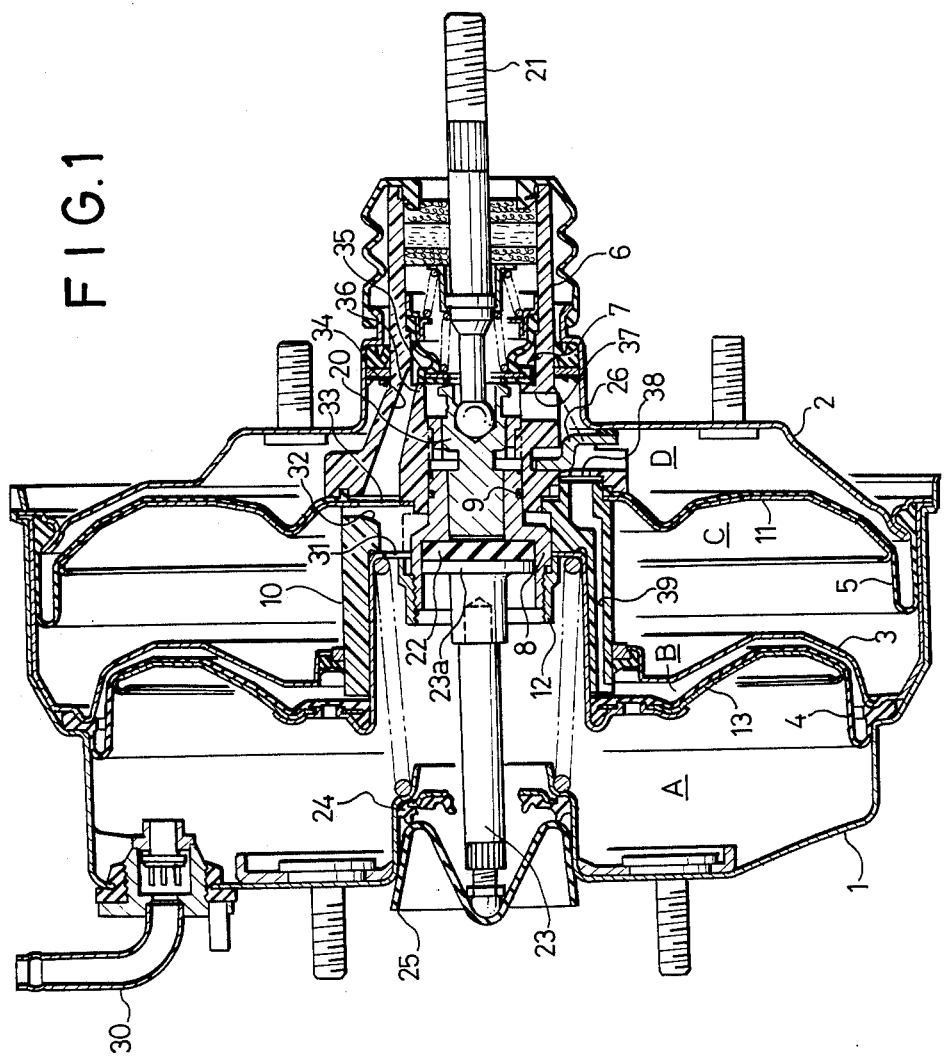
FIG. 1 is a cross section of an embodiment of the invention.

Referring to the drawings, an embodiment of the invention will be described. In FIG. 1, a combination of a front shell 1 and a rear shell 2 defines an enclosed vessel in which a center plate 3, a front diaphragm 4 and a rear diaphragm 5 are disposed to divide the interior into four chambers A, B, C and D.

A valve body 6 is slidably disposed within an axial portion of the enclosed vessel, and contains a valve mechanism 7 therein. A hub 8 is fitted into the axial portion of the valve body 6 and is hermetically sealed by a seal member 9, the hub being formed with engaging portions 8a at its right-hand end which are engaged with mating recesses 6a formed in the valve body 6 to prevent the withdrawal and displacement to the left of the hub while simultaneously preventing a relative rotation between the valve body 6 and the hub 8.

Figure 2:
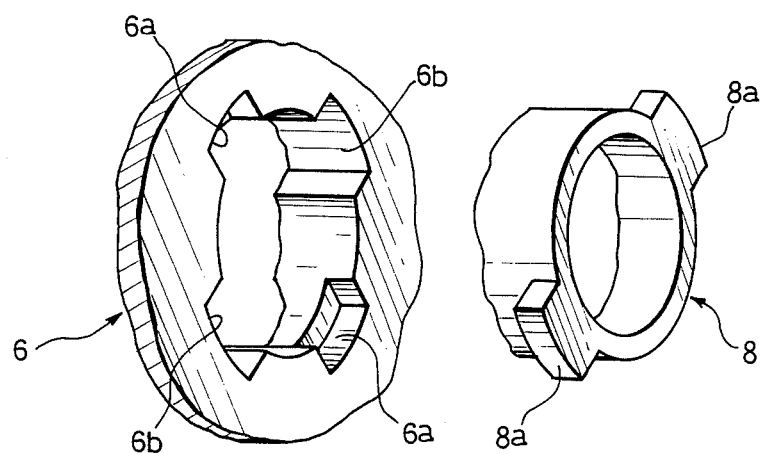
FIG. 2 is an exploded, perspective view, illustrating an interconnection between a valve body 6 and a hub 8.

As shown in FIG. 2, the engaging portions 8a of the hub 8 project radially outward at diametrically opposite positions from the right end of the hub 8. On the other hand, the valve body 6 is formed with axial grooves 6b therein which permit the engaging portions 8a to move therethrough, and are also formed with the mating recesses 6a which are displaced 90° from the axial grooves 6b and which are engaged by the engaging portions 8a. Accordingly, after passing the engaging portions 8a of the hub 8 through the axial grooves 6b, the engaging portions may be rotated through 90° to engage them with the recesses 6a, whereupon a withdrawal of the hub from the valve body 6 is prevented while simultaneously preventing a relative rotation between the hub 8 and the valve body 6.

A center body 10 is fitted around the hub 8, and the inner peripheries of the rear diaphragm 5 and the rear power piston 11 are held between the right end face of the center body 10 and the left end face of the valve body 6 while the inner periphery of the front power piston 13 is held between the left end face and a nut 12 which is threadably engaged with the hub 8. By tightening the nut 12 under this condition, the valve body 6, the rear diaphragm 5, the rear power piston 11, the center body 10 and the front power piston 13 can be connected together in an integral manner between the engaging portions 8a of the hub 8 and the nut 12.

A valve plunger 20, which forms the valve mechanism 7, has its right end connected to an input shaft 21 which is mechanically coupled to a brake pedal, not shown, while its left or front end is disposed opposite to an end face of a reaction disc 22 which is disposed within the hub 8. The other end face of the reaction disc 22 is disposed in contact with the right end face of a push rod 23 which is slidably fitted into a portion 8b of the hub 8 having an increased diameter. The front end of the push rod 23 extends through an axial portion of the front shell 1, with a seal member 24 interposed therebetween, and slidably projects to the exterior thereof. The front shell 1 is provided with a protector 25 in order to prevent any damage to be caused to the seal member 24 as a result of an oscillation of the push rod 23 during the shipment of the tandem brake booster.

A key member 26 is used to prevent the withdrawal of the valve plunger 20 from the hub 8. The key member 26 extends radially through the valve body 6 and the hub 8 and is mechanically coupled to the valve plunger 20 for integral movement, and is itself prevented from being withdrawn from the valve body 6 by suitable means, not shown, which serves such purpose.

The chamber A mentioned above represents a constant pressure chamber into which a negative pressure is introduced and maintained. The chamber A communicates with an intake manifold, not shown, through a tube 30 mounted on the front shell 1 which serves introducing a negative pressure. The chamber A is also maintained in communication with a constant pressure chamber C through an opening 31 formed in the front power piston 13 and a first passage 32 formed in the center body 10.

The constant pressure chambers A and C can be made to communicate with a variable pressure chamber D through an opening 33 formed in the rear power piston 11, a passage 34 formed in the valve body 6, a clearance between a valve element 35 and a valve seat 36 of the valve mechanism 7 and a radial passage 37 formed in the valve body 6. The chamber D is in turn maintained in communication with a variable pressure chamber B through a passage 38 formed in the valve body 6 and a second passage 39 formed in the center body 10.

Figure 4:
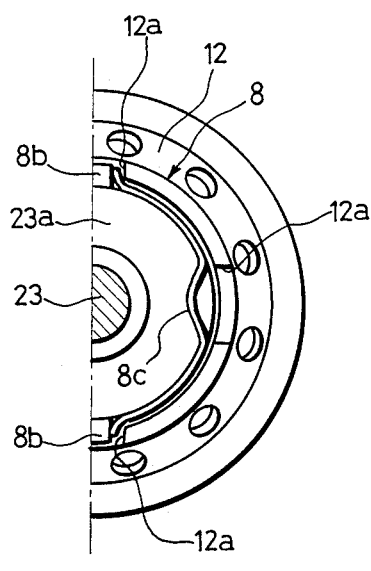
FIG. 4 is a left side elevation of FIG. 3.
Figure 3:
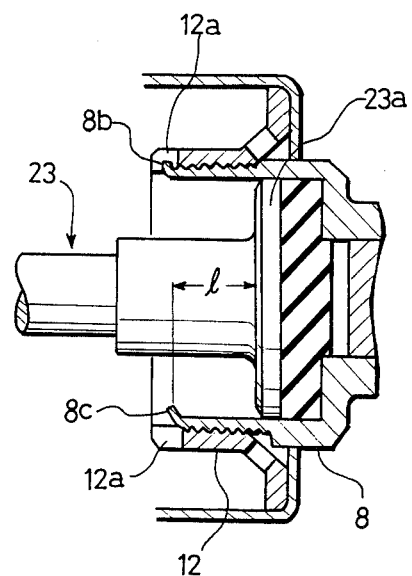
FIG. 3 is an enlarged view of part of the arrangement shown in FIG. 1.
Figure 2:
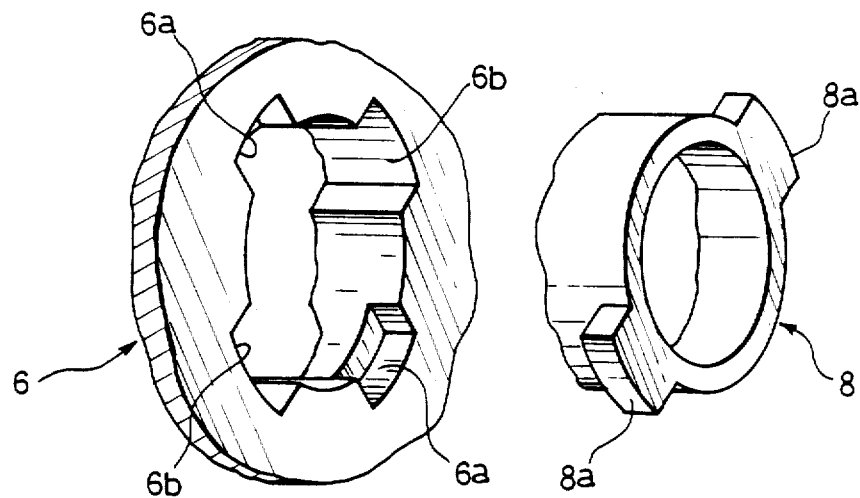
Figure 4:
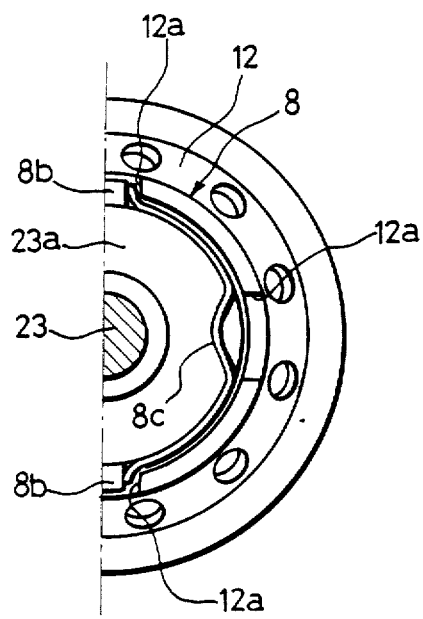
Figure 3:
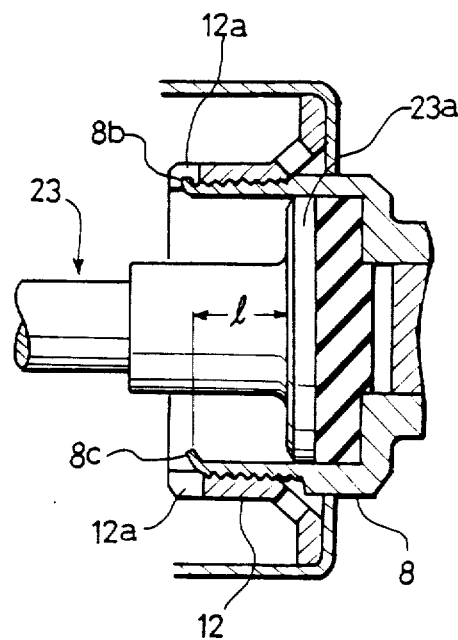

Referring to FIGS. 3 and 4, at its left end, the nut 12 is formed with a plurality of recesses 12a, which are four in the embodiment shown, which are disposed at given positions. At positions which are located opposite to a pair of diametrically opposite recesses 12a, the hub 8 is formed with a pair of anti-rotation locks 8b which extend radially outward to be positioned within the respective recesses 12a, thereby providing an integral connection between the hub 8 and the nut 12 to prevent any loosening therebetween. At positions which are disposed opposite to the remaining pair of recesses 12a, the hub 8 is formed with a pair of stops 8c which extend radially inward for abutment against the end 23a of the push rod 23, thus preventing its withdrawal.

The anti-rotation locks 8b and the stops 8c can be easily formed subsequent to tightening the nut 12 against the hub 8 with a required torque, by inserting a required fixture from the front side to bear against the front end of the hub 8 at desired positions to urge it inward or outward.

In the present embodiment, the stops 8c are each formed by spacing it from the end 23a by a predetermined distance l, as referenced to the end 23a of the push rod 23 which is maintained in abutment against the reaction disc 22. By disposing the hub 8 and the valve body 6 to its left, forwardmost position to allow the push rod 23 to be tipped through an increased angular stroke, the end 23a may be passed between a pair of oppositely located stops 8c for removal thereof, thus enabling the reaction disc 22 to be changed.

While the invention has been described above in connection with a preferred embodiment thereof, it should be understood that a number of changes, modifications and substitutions will readily occur to one skilled in the art on the basis of the above disclosure without departing from the spirit and scope of the invention defined by the appended claims.

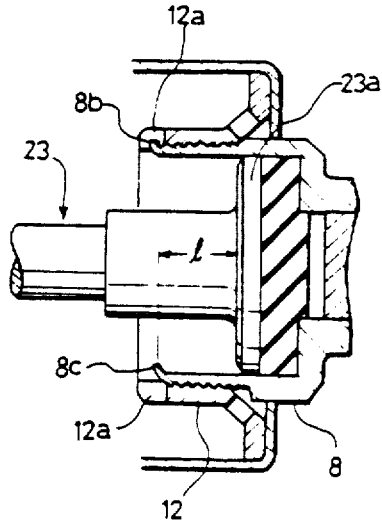

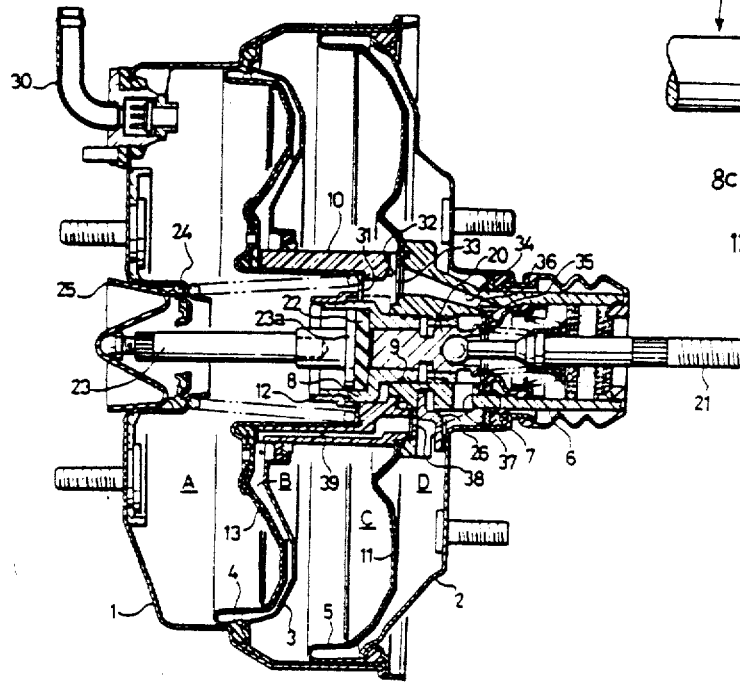

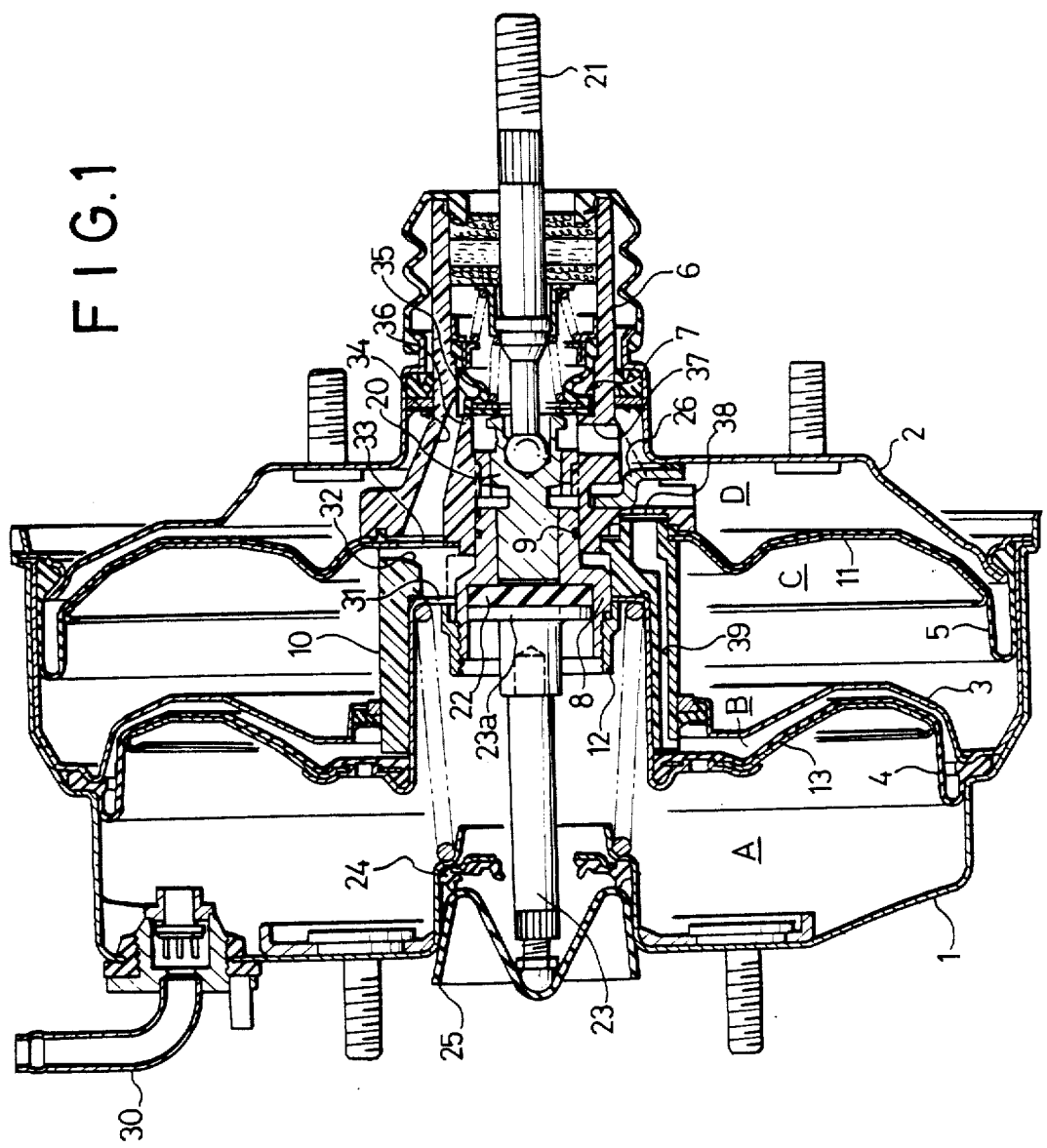

What is claimed is:

1. A tandem brake booster including a hub fitted over an axial portion of a valve body in a manner to prevent its withdrawal in the forward direction therefrom, a nut threadably engaged with the outer periphery of the hub at its front end for securing the hub to the valve body, and a push rod slidably fitted into the front end of the hub;

wherein the nut is formed with a plurality of recesses at given positions therein while the hub is formed with stops extending radially inward for abutment against an end of the push rod to prevent its withdrawal and also formed with anti-rotation locks extending radially outward for engagement with the recesses to provide an integral connection between the hub and the nut, both the stops and the anti-rotation locks being disposed in a manner opposing the recesses, wherein four of the recesses are formed in the front end of the nut at an equal interval while the hub is formed with a pair of said anti-rotation locks located opposite to a pair of diametrically opposite ones of said recesses in the nut and is also formed with a pair of said stops located opposite to the remaining two recesses.

2. A tandem brake booster according to claim 1 in which the stops are spaced by a given distance from the end of the push rod, enabling the end of the push rod to pass between a pair of opposing said stops while the push rod assumes a tipped position.

3. A tandem brake booster including a hub fitted over an axial portion of a valve body in a manner to prevent its withdrawal in the forward direction therefrom, a nut threadably engaged with the outer periphery of the hub at its front end for securing the hub to the valve body, and a push rod slidably fitted into the front end of the hub;

wherein the nut is formed with a plurality of recesses at given positions therein while the hub is formed with stops extending radially inward for abutment against an end of the push rod to prevent its withdrawal and also formed with anti-rotation locks extending radially outward for engagement with the recesses to provide an integral connection between the hub and the nut, both the stops and the anti-rotation locks being disposed in a manner opposing the recesses, in which the hub is formed with a pair of said anti-rotation locks located opposite to a pair of diametrically opposite ones of said recesses in said nut, which stops are spaced by a given distance from the end of the push rod for enabling the end of the push rod to pass between a pair of opposing said stops while the push rod assumes a tipped position.

4. A tandem brake booster including a hub fitted over an axial portion of a valve body in a manner to prevent its withdrawal in the forward direction therefrom, a nut threadably engaged with the outer periphery of the hub at its front end for securing the hub to the valve body, and a push rod slidably fitted into the front end of the hub, the nut being formed with a plurality of recesses at given positions therein; and means formed on said hub for preventing both (1) withdrawal of said push rod forwardly from said hub and (2) rotation and corresponding unthreading of said nut with respect to said hub, said preventing means formed on said hub comprising stops extending radially inward for abutment against an end of the push rod and further comprising anti-rotation locks extending radially outward for engagement with the recesses to provide an integral connection between the hub and the nut, both the stops and the anti-rotation locks being radially aligned with corresponding ones of said recesses in said nut.

5. A tandem brake booster according to claim 4, further characterized in that a rear end of the hub is formed with an engaging portion which extends radially outward while the valve body is formed with a mating opening in which the hub is fitted, an axial groove being formed in the internal peripheral surface of the mating opening to permit the passage of the engaging portion therethrough, a rear end face of the valve body being formed with a mating recess which is circumferentially displaced from the axial groove and which is adapted to engage the engaging portion on the hub to prevent the hub from being withdrawn forwardly and to prevent a relative rotation therebetween.

6. A brake booster according to claim 4 in which said hub is a hollow shell of peripheral wall thickness which is small compared to its inside radius, the forward end of said shell being of material capable of being deformed radially outward into an opposed said recess of said nut to form said anti-rotation lock and capable of being radially inwardly deformed away from a said opposed recess of said nut to form a said stop.

* * * * *

UNITED STATES PATENT AND TRADEMARK OFFICE
CERTIFICATE OF CORRECTION

PATENT NO.   : 4,882,980

DATED        : November 28, 1989

INVENTOR(S)  : Masao Arino et al

It is certified that error appears in the above-identified patent and that said Letters Patent is hereby corrected as shown below:

The title page showing the number of drawings sheets should be deleted and substitute therefor the attached title page.

The sheets of drawings consisting of Figs. 1-4, should be added as shown on the attached pages.

Signed and Sealed this

Twenty-fifth Day of August, 1992

Attest:

DOUGLAS B. COMER

Attesting Officer      Acting Commissioner of Patents and Trademarks

United States Patent [19]
Arino et al.

[11] Patent Number: 4,882,980
[45] Date of Patent: Nov. 28, 1989

[54] TANDEM BRAKE BOOSTER

[75] Inventors: Masao Arino; Jinki Takase, both of Saitama, Japan

[73] Assignee: Jidosha Kiki Co., Ltd., Tokyo, Japan

[21] Appl. No.: 243,057

[22] Filed: Sep. 9, 1988

[30] Foreign Application Priority Data

Oct. 28, 1987 [JP] Japan .................. 62-164861[U]

[51] Int. Cl.⁴ .................. F01B 19/02; F15B 9/10
[52] U.S. Cl. .................. 92/48; 92/128; 91/369.2; 403/320; 411/271
[58] Field of Search .................. 92/48, 49, 128; 403/320, 348, 349; 411/271, 925; 91/376 R, 369.2

[56] References Cited

U.S. PATENT DOCUMENTS

| | | | |
|---|---|---|---|
| 505,947 | 10/1893 | Löhnert | 411/925 X |
| 601,915 | 4/1898 | Thurmend | 411/925 X |
| 4,494,445 | 1/1985 | Furuta et al. | 92/49 X |
| 4,495,854 | 1/1985 | Hibino | 92/99 X |
| 4,512,237 | 4/1985 | Endoh et al. | 91/369 A |
| 4,619,185 | 10/1986 | Mori et al. | 91/369 R |
| 4,658,704 | 4/1987 | Mori et al. | 91/369 R |
| 4,718,328 | 1/1988 | Mori et al. | 91/376 R |
| 4,729,287 | 3/1988 | Boehm et al. | 92/99 X |

FOREIGN PATENT DOCUMENTS 15645  5/1914  United Kingdom ........ 411/271

*Primary Examiner*—Robert E. Garrett
*Assistant Examiner*—Mark A. Williamson
*Attorney, Agent, or Firm*—Flynn, Thiel, Bouteil & Tanis

[57] ABSTRACT

An interconnecting structure between a hub and a nut of a tandem brake booster is disclosed. The nut is formed with a plurality of recesses while the hub is formed with anti-rotation locks extending radially outward for engagement with the recesses to prevent a rotation of the nut relative to the hub, and also formed with stops extending radially inward for abutment against an end of a push rod which is received within the hub to prevent such end from being withdrawn from the hub.

6 Claims, 2 Drawing Sheets